US006484769B2

(12) United States Patent (10) Patent No.: US 6,484,769 B2
Seymour (45) Date of Patent: Nov. 26, 2002

(54) DELIMBING DEVICE AND METHODS (75) Inventor: Kerry Seymour, 1009 Country Club Rd., Perry, GA (US) 31069

(73) Assignee: Kerry Seymour, Perry, GA (US)

( * ) Notice: Subject to any disclaimer, the term of this patent is extended or adjusted under 35 U.S.C. 154(b) by 49 days.

(21) Appl. No.: 09/726,154

(22) Filed: Nov. 29, 2000

(65) Prior Publication Data

US 2002/0062877 A1 May 30, 2002

(51) Int. Cl.[7] .............................. A01G 23/08; B27L 1/00
(52) U.S. Cl. ...................... 144/338; 144/4.1; 144/24.13; 144/343
(58) Field of Search ................ 144/4.1, 24.13, 144/34.1, 336, 338, 343

(56) References Cited

U.S. PATENT DOCUMENTS

| 3,029,848 A | 4/1962 | Bombardier |
| 3,269,436 A | 8/1966 | Moore |
| 3,398,774 A | 8/1968 | Hahn |
| 3,635,266 A | 1/1972 | Eriksson |
| 3,805,858 A | * 4/1974 | Morin ........................ 144/343 |
| 3,948,299 A | 4/1976 | Laforge et al. |
| 4,067,367 A | * 1/1978 | Adamson .................. 144/24.13 |
| 4,130,151 A | 12/1978 | Ericsson |
| 4,335,766 A | * 6/1982 | Davis et al. .............. 144/24.13 |
| 4,350,189 A | 9/1982 | Duchesne |
| 4,382,457 A | 5/1983 | Hahn |
| 4,440,202 A | * 4/1984 | Everett ..................... 144/24.13 |
| 4,574,855 A | 3/1986 | Jörgensen et al. |
| 4,588,008 A | * 5/1986 | Napper ....................... 144/343 |
| 4,766,939 A | 8/1988 | Forslund |
| 4,981,163 A | 1/1991 | Westlund |
| 5,146,960 A | * 9/1992 | Blakely .................... 144/24.13 |
| 5,174,350 A | 12/1992 | Johansson et al. |
| 5,406,997 A | 4/1995 | Davison |
| 5,533,555 A | 7/1996 | Hudson |
| 5,628,354 A | 5/1997 | Kingston |
| 5,704,407 A | 1/1998 | Hamby, Jr. |
| 5,887,635 A | 3/1999 | Hamby, Jr. |
| 6,155,317 A | 12/2000 | Seymour |

* cited by examiner

Primary Examiner—W. Donald Bray
(74) Attorney, Agent, or Firm—Kilpatrick Stockton; John S. Pratt; Michael K. Dixon (57) ABSTRACT

A push-through delimber device having a frame, a blade lattice, a trough, a throat and a saw so that trees can be topped and delimbed in the throat and pushed through the delimbing blade lattice to further delimb the trees.

96 Claims, 6 Drawing Sheets

DELIMBING DEVICE AND METHODS

FIELD OF THE INVENTION

This invention relates to logging equipment and, more specifically, to devices used to strip branches off harvested or felled trees.

BACKGROUND OF THE INVENTION

Historically, delimbing felled or harvested trees was performed manually using axes, hand saws and powered chain saws. This method of delimbing works well on large trees with sporadic branches because the weight of a felled tree trunk will snap many of the branches off the trunk leaving a minimal amount of delimbing to be performed. When smaller trees with many branches are felled, the trunk weight is often insufficient to cause the branches to snap off. Consequently, the hand delimbing process was dangerous and unpredictable, as well as time consuming.

As a result, delimbers have been developed which strip branches off a whole tree at the harvesting site, thereby eliminating the need for manual delimbing and drastically reducing the time necessary for delimbing. Thus, the need for delimbing machines has grown over the years as modern forestry practice has relied on clear cutting and forest thinning through the removal of smaller trees.

A popular type of delimber is a pull through delimber. The majority of pull through delimbers allow for a tree to be placed in the delimbing device with delimbing blades surrounding and parallel to the tree trunk. The tree is then pulled through the device with the blades cutting the branches as it traverses the assembly. The majority of these types of machines contain hydraulics or electronics causing them to be very expensive to purchase and operate. As a result of the high purchase and operating costs, many logging operations cannot afford to purchase such delimbers. Another disadvantage of these types of delimbers is that they only delimb one tree at a time. Additionally, most of these delimbing assemblies are very complicated with many moveable parts that are susceptible to damage and breakdown.

A second type of delimbing device is the mechanical pull through type delimber. U.S. Pat. No. 5,406,997, to Davison, describes a mechanical pull through delimbing device that does not use any electronic or hydraulic components. Instead, the Davison device uses the weight of a tree to actuate the delimbing blades. In Davison, a tree is placed onto the assembly so that the weight of the tree rests on a lever causing a set of delimbing blades to close about the trunk. The trunk is then pulled through the delimbing assembly causing the branches to be stripped off the trunk.

The Davison device eliminates the use of hydraulics and electronics; however, the assembly uses many moving parts that are susceptible to breakdown and jamming. Furthermore, the Davison delimber only allows for one tree to be placed into the assembly at a time resulting in a slow and tedious process in delimbing trees in a logging operation. An additional drawback associated with the Davison device is that it relies on the weight of the tree to close the blades. This method of operation is troublesome for small trees whose weight is insufficient to properly close the blades around the trunk. Davison also uses a spring to exert an opposite force on the support lever, and the spring is susceptible to stretching and breaking.

In general, most mechanical delimbing devices are cost prohibitive for soft wood logging operations because of the capital investment and maintenance requirements of complicated delimbing apparatuses. In addition, many delimbers in the market are cumbersome to transport from one site to another and require setup and breakdown time. Thus, what is needed is a delimbing device that delimbs multiple trees, is easily transportable, has few movable parts, and is affordable.

SUMMARY OF THE INVENTION

This invention is a stationary assembly used to strip limbs from trees. The delimbing assembly is mounted on a base trailer. The base has an axle and wheels on one end and a hitch on the other allowing for easy transportation from one harvesting site to another. The assembly allows multiple trees to be processed simultaneously. The blade assembly includes a plurality of crisscrossing straight blades forming a plurality of apertures. A knuckle boom loader, for example, pushes multiple trees through the delimber. To increase the efficiency of the delimber, a trough structure directs the trees into the blade assembly. As trees are pushed through the blade lattice, each trunk moves through an open aperture allowing the limbs to come into contact with a blade edge; thereby stripping the limbs from the trunk. A saw box is coupled to the assembly for topping the trees.

Primary objectives of this invention are to provide:

the logging industry with a push through delimbing device that is durable, easier to use, less susceptible to jamming and less expensive to operate;

a push through delimbing device that can delimb multiple trees simultaneously;

a push through delimbing device that operates without the aide of any hydraulic, mechanical or electronic control; and a push through delimbing assembly for use in delimbing soft woods, which is affordable throughout the logging industry.

Still further objects and advantages will become apparent from consideration of the following description and drawings.

BRIEF DESCRIPTION OF THE DRAWINGS

FIG. 1B is a front perspective view of the delimbing assembly of FIG. 1A showing the trees being topped;

FIG. 1C is a front perspective view of the delimbing assembly of FIG. 1A showing the trees being pushed through the blade lattice;

FIG. 1D is a front perspective view of the delimbing assembly of FIG. 1A showing an alternate embodiment of the blade lattice of FIG. 1A;

DETAILED DESCRIPTION OF THE DRAWINGS

Figure 1A:
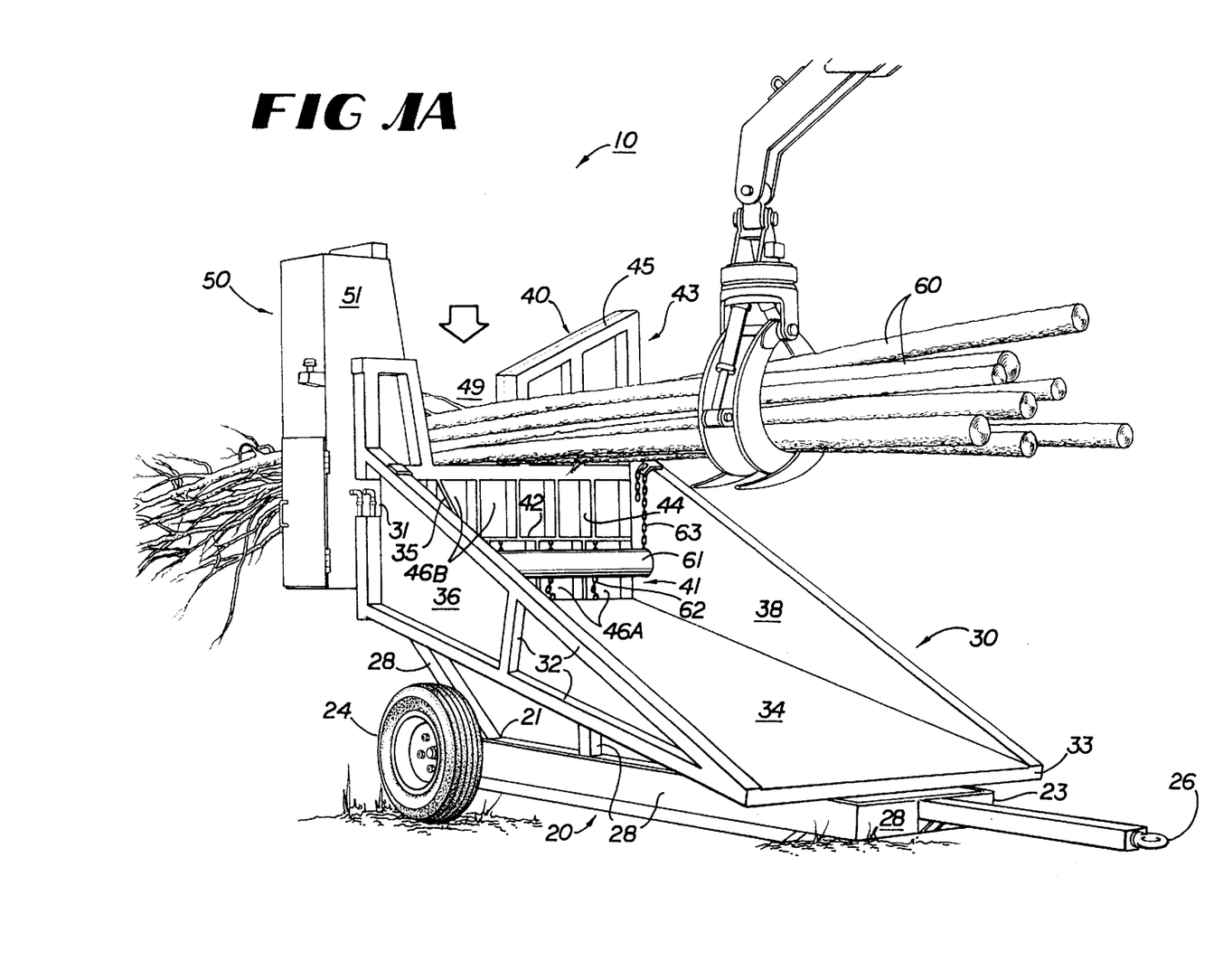
FIG. 1A is a front perspective view of the delimbing assembly of this invention holding multiple trees in the throat.

FIGS. 1A–C show a front perspective view of an exemplary stationary push-through delimber 10 of this invention.

Delimber 10 includes a trailer frame 20 that supports a trough 30 closed on one end by a blade assembly 40 and a saw box 50.

Trailer frame 20 is formed from rigid material such as tubular steel beams 28. Beams 28 are welded or otherwise fastened together to form frame 20. Trailer frame 20 rests on axel 22 (see FIG. 2) and wheels 24 mounted at end 21 of trailer 20. A hitch 26 is mounted to end 23 of trailer 20. Wheels 24 and hitch 26 allow for ease of use and transport of delimber 10 from one logging location to another.

Trough 30 is formed from a steel frame 32, a bottom steel plate 34, and left and right steel plates 36 and 38, respectively. Plates 34, 36 and 38 are welded or otherwise attached to frame 32 and each other. Trough 30 is also coupled to trailer frame 20. Side walls 36 and 38 are coupled so that they are perpendicular to bottom steel plate 34. Trough 30 also has an first open end 33 that aligns with end 23 of trailer 20 and a second open end 31 that terminates into blade assembly 40. Because trough 30 slopes upward from end 33 to end 31, trough 30 directs the tree or trees into blade assembly 40 during the delimbing process. To further direct trees into blade assembly 40, a baffle 35 is vertically coupled between side wall 36 and blade assembly 40. Baffle 35 is situated at a 45 degree angle so that trees 60 are deflected off baffle 35 and into blade assembly 40.

Blade assembly 40 has two major areas. The first is a rectangular blade lattice 41 and the second is a upper support section 43. Blade lattice 41 is formed from a single horizontal blade 42 and multiple vertical blades 44, which are coupled to each other and to a frame 45. Blades 42 and 44 may typically be ¾"×6" flat bar mild steel. Neither edges of blades 42 and 44 need be sharpened. However, the edges of blades 42 and 44 may be sharpened. The crisscrossing blades form a plurality of apertures 46A and 46B for allowing individual trunks to pass through blade assembly 40. Upper support section 43 is formed from a portion of frame 45 and consists of a "U" shaped aperture or "throat" 49 for receiving a plurality of trees and a slanted portion of frame 45 for directing trees into throat 49.

Figure 2:
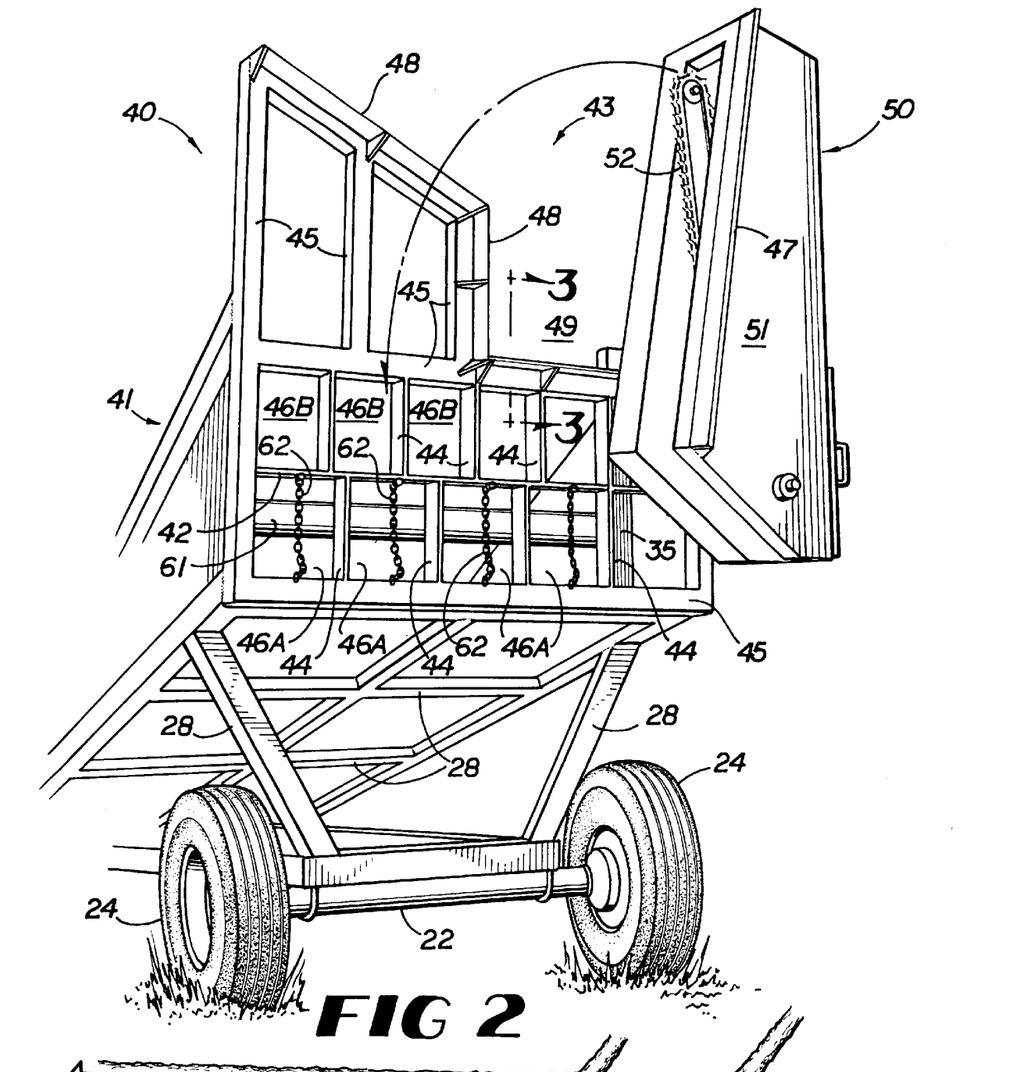
FIG. 2 is a rear perspective view of the delimbing assembly of FIG. 1A showing the saw box and the rear of the blade lattice.
Figure 3:
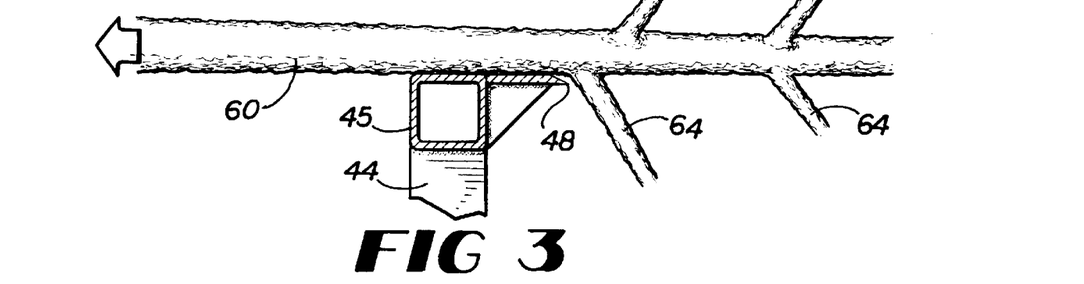
FIG. 3 is a cut away view along line 3—3 of FIG. 2 showing a blade in contact with a tree limb.

As shown in FIG. 2, apertures 46A and 46B are of unequal size. Top apertures 46B are sized, for example, 13"×17" and lower apertures 46A are sized, for example, 16"×17". In addition, lower apertures 46A are bisected by vertically suspended flexible dividers 62. For illustrative purposes, flexible dividers 62 are shown in the drawings as chains. Flexible dividers 62 are mounted between horizontal blade 42 and frame 45 so that flexible dividers 62 contain slack. The slack in flexible dividers 62 allow them to move somewhat horizontally within apertures 46A. It can be appreciated that flexible dividers 62 may be replaced by, for example, a flexible cable or any other suitable means. Flexible dividers 62 are welded in place or otherwise attached.

Referring now to FIGS. 1A–1C and 2, a moveable barrier 61 is suspended from chains 63 to hang horizontally across and in front of blade lattice 41. Barrier 61 can be mounted to frame 45 or to trough 30 using chains 63, cables or any other suitable means to suspend barrier 61 in position. Barrier 61 effectively reduces the size of apertures 46A. However, because barrier 61 is suspended using chains 63, barrier 61 is free to move in the vertical direction in effect making the size of apertures 46A variable. Preferably, barrier 61 is a pipe with a six inch diameter and suspended so that the top of barrier 61 is aligned with the top of horizontal blade 42. Although barrier 61 is preferred to increase the efficiency and effectiveness of delimber 10, delimber 10 can operate without barrier 61, as shown in FIG. 1D. In addition, the alternate blade lattice shown in 1D can also be used; thereby eliminating the need for flexible dividers 62.

To aide in the delimbing process, two additional delimbing blades 47 and 48 are coupled to delimber 10. The first blade 47 is mounted on the rear of saw box 50 and the second blade 48 is mounted on the top edge of frame 45, which are clearly shown in FIG. 2. The edges of blades 47 and 48 are orientated so that they point away from trough 30.

Figure 4:
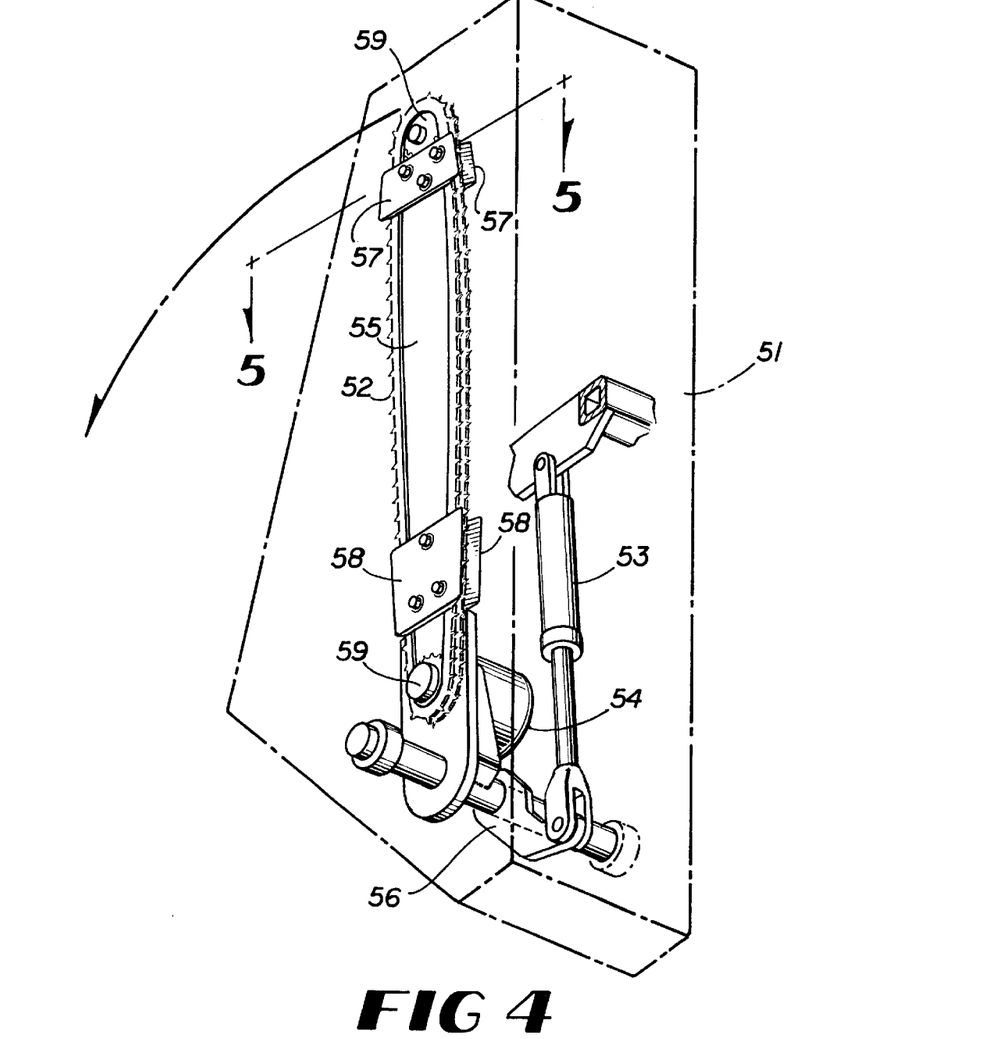
FIG. 4 is a perspective view of the saw box shown in FIGS. 1–2.
Figure 4B:
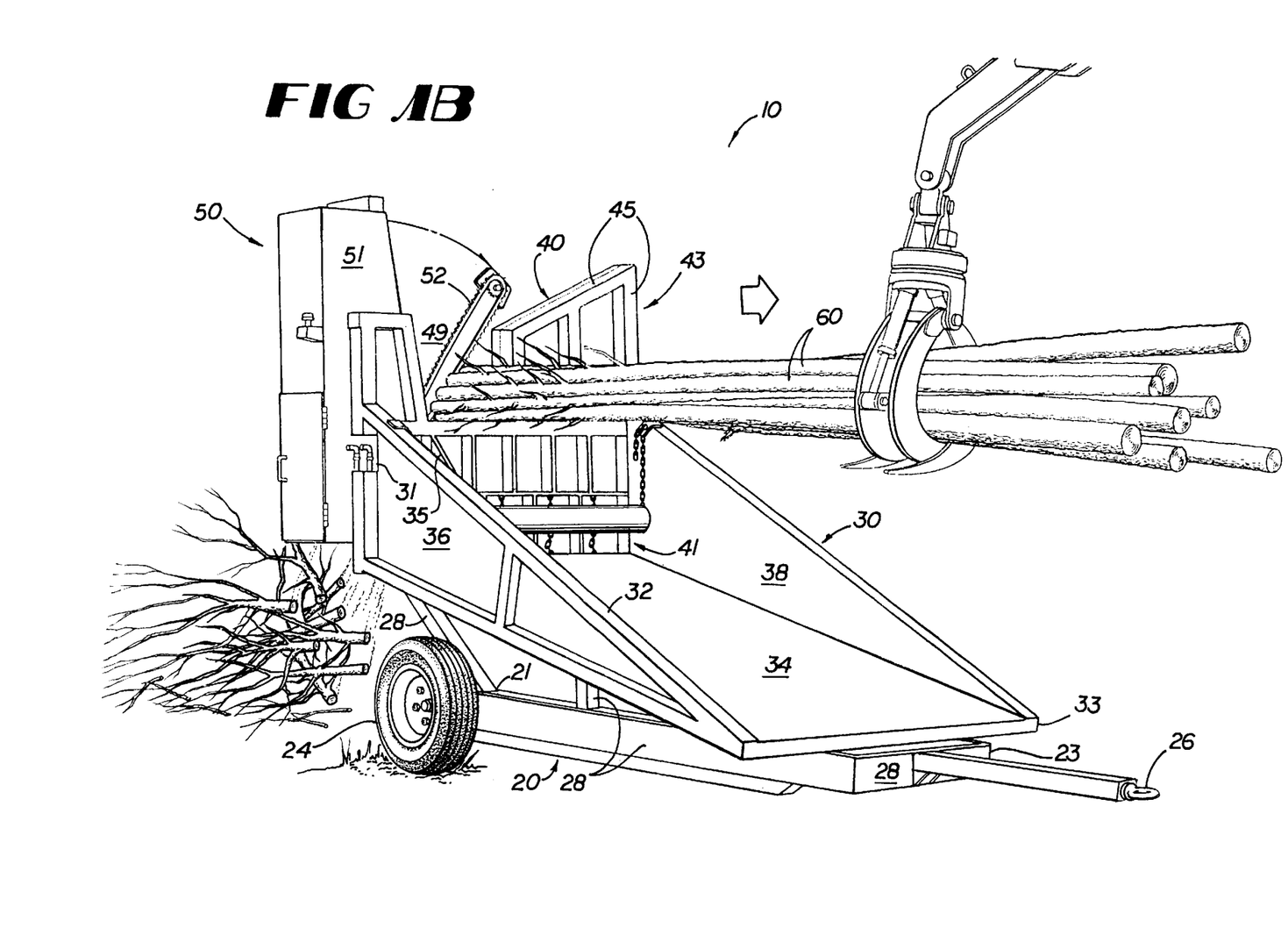
Figure 4C:
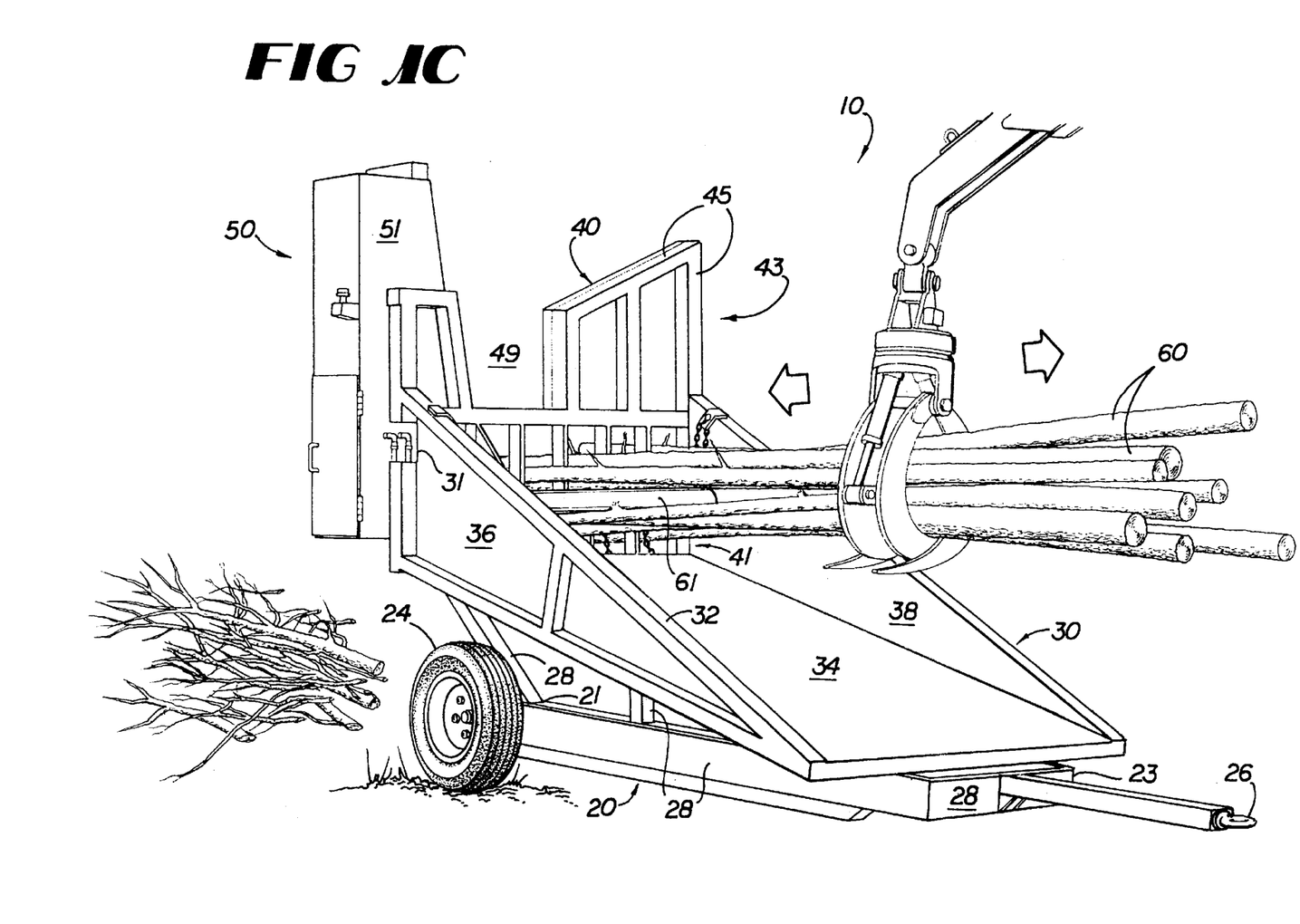
Figure 4D:
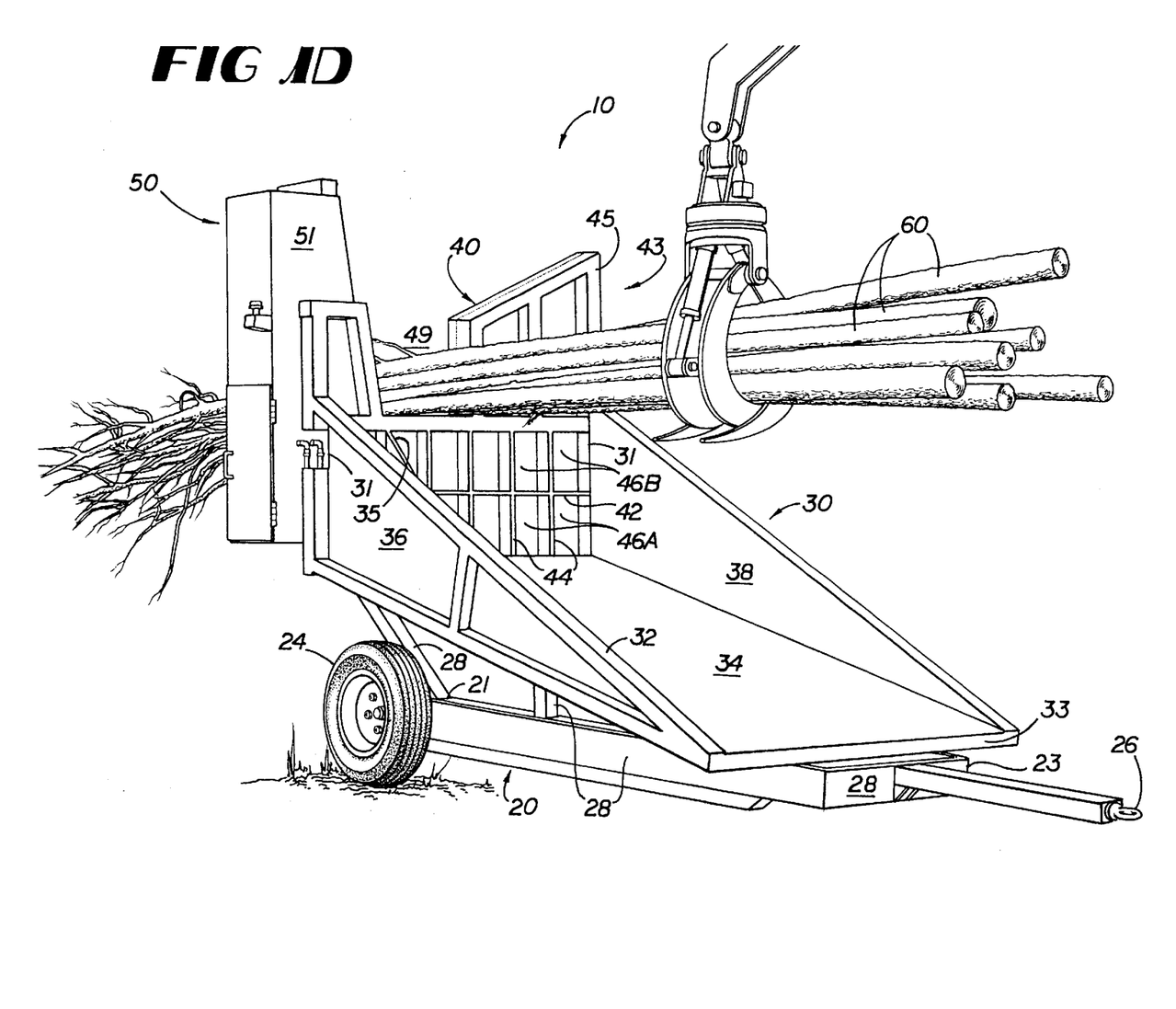
Figure 5:
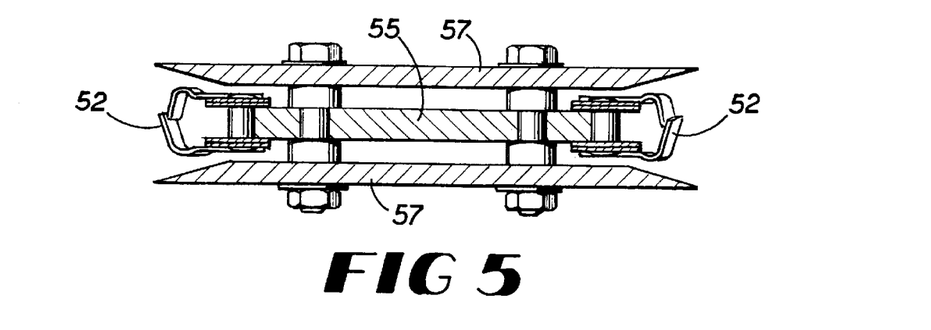
FIG. 5 is a detail cut away view along line 5—5 of FIG. 4 showing a chainsaw guide of the this invention.

Saw box 50 mounted on the rear of delimber 10, as shown in FIGS. 1A–C so that a blade 52 can top trees 60. Saw box 50 includes a housing 51, cutting blade 52, a hydraulic actuator 53, motor 54 blade plate 55 and actuator arm 56, as shown in FIG. 4. As shown in FIG. 1A–D, saw box 50 is orientated such that blade 52 will top trees lying in throat 49 by pivoting across throat 49. Blade rerailer plates 57 and 58 (see FIG. 4) are coupled to blade plate 55 to assist in keeping chain saw blade 52 from falling off sprockets 59.

Delimber 10 operates on multiple trees 12 or on a single tree as follows. As shown in FIG. 1A, a plurality of trees 60 are lifted by their butt ends and placed into throat 49. Any straggling trees are directed into throat 49 by the sloped portion of frame 45. Trees 60 are then pulled back toward trough 30 to position the trees for topping. During the positioning stage, delimbing blades 47 and 48 strip most of the limbs 64 off trees 60. Once trees 60 are properly positioned in throat 49 for topping, saw blade 52 pivots from housing 51 and cuts off the tops of trees 60, as shown in FIG. 1B.

Finally, as shown in FIG. 1C, after topping occurs the trees are pushed through the delimbing blade lattice to strip the remaining limbs 64 from trees 60. The loader can move trees 60 back and forth through blade lattice 41 until all limbs 64 have been removed. Barrier 61 is used to block a portion of lower apertures 46A, effectively making lower apertures 46A smaller. As the trunks are pushed through blade lattice 41, barrier 61 moves upward or downward to accommodate different size trunks. Consequently, barrier 61 aides in delimbing small limbs 64 that would ordinarily pass through apertures 46A without being sheared off. As trees 60 are passed through apertures 46A, barrier 61 adjusts to the proper height in effect sizing apertures 46A so that all limbs 64 are effectively sheared of trees 60. In addition, flexible dividers 62 conform to the trunks moving through apertures 46A, thereby effectively increasing the ability to shear limbs 64 from small trees. Delimbed trees 60 are then piled to the side of delimber 10 and a new set of trees is processed.

The foregoing is provided for purposes of illustrating, explaining, and describing embodiments of the present invention that provide a device for delimbing trees in a safe and economical manner. Modifications and adaptations to these embodiments will be apparent to those skilled in the art and may be made without departing from the scope or spirit of the invention or the following claims.

What is claimed is:

1. A tree delimbing device comprising:
   a. at least one horizontal delimbing blade;
   b. at least one vertical delimbing blade coupled to the horizontal delimbing blade to form a delimbing blade lattice with a plurality of apertures; and
   c. a trough coupled to the blade lattice for directing trees into the delimbing blade lattice, the trough comprising a floor and at least one side positioned adjacent to the floor.

2. The tree delimbing device of claim 1, further comprising a plurality of horizontal and vertical delimbing blades.

3. The tree delimbing device of claim 1, further comprising a frame coupled to the delimbing blade lattice.

4. The tree delimbing device of claim 3, wherein the frame contains an integrally formed throat.

5. The tree delimbing device of claim 4, wherein the throat is located above the delimbing blade lattice.

6. The tree delimbing device of claim 4, wherein the throat is "U" shaped.

7. The tree delimbing device of claim 4, wherein a portion of the frame slopes downward toward the throat.

8. The tree delimbing device of claim 3, further comprising a first rearward facing delimbing blade coupled to the frame.

9. The tree delimbing device of claim 8, further comprising a saw box coupled to the delimbing blade lattice.

10. The tree delimbing device of claim 9, further comprising a second rearward facing delimbing blade coupled to the saw box.

11. The tree delimbing device of claim 1, wherein the trough is sloped upward toward the delimbing blade lattice.

12. The tree delimbing device of claim 11, further comprising a vertical baffle mounted at an angle between the trough and the delimbing blade lattice for directing trees into the delimbing blade lattice.

13. The tree delimbing device of claim 1, further comprising a barrier that is generally horizontally suspended in front of the delimbing blade lattice.

14. The tree delimbing device of claim 13, wherein the suspended barrier can move in the vertical direction.

15. The tree delimbing device of claim 14, wherein the suspended barrier comprises pipe.

16. The tree delimbing device of claim 1, further comprising at least one flexible divider bisecting at least one of the apertures.

17. The tree delimbing device of claim 16, wherein the flexible divider contains slack allowing it to move in the horizontal direction.

18. The tree delimbing device of claim 16, wherein the flexible divider comprises cable.

19. The tree delimbing device of claim 16, wherein the flexible divider comprises chain.

20. A tree delimbing device, comprising:
  a. at least one horizontal delimbing blade;
  b. at least one vertical delimbing blade coupled to the horizontal delimbing blade to form a delimbing blade lattice having a plurality of apertures;
  c. a frame coupled to the delimbing blade lattice;
  d. a throat formbed by the frame for receiving a tree; and
  e. wherein a portion of the frame slopes downward toward the throat.

21. The tree delimbing device of claim 20, the delimbing blade lattice further comprising a plurality of horizontal and vertical blades.

22. The tree delimbing device of claim 20, further comprising a trough coupled to the frame for directing trees into the delimbing blade lattice.

23. The tree delimbing device of claim 22, wherein the trough is sloped upward toward the delimbing blade lattice.

24. The tree delimbing device of claim 20, further comprising a saw for topping trees located in the throat.

25. The tree delimbing device of claim 24, wherein the saw is housed in a saw box coupled to the frame.

26. The tree delimbing device of claim 25, further comprising a first rearward facing delimbing blade coupled to the saw box.

27. The tree delimbing device of claim 26, further comprising a second rearward facing delimbing blade coupled to the frame.

28. The tree delimbing device of claim 20, further comprising a barrier that is generally horizontally suspended in front of the delimbing blade lattice.

29. The tree delimbing device of claim 28, wherein the suspended barrier can move in the vertical direction.

30. The tree delimbing device of claim 29, wherein the suspended barrier comprises pipe.

31. The tree delimbing device of claim 20, further comprising at least one flexible divider bisecting at least one of the apertures.

32. The tree delimbing device of claim 31, wherein the flexible divider contains slack allowing it to move in the horizontal direction.

33. The tree delimbing device of claim 31, wherein the flexible divider comprises cable.

34. The tree delimbing device of claim 31, wherein the flexible divider comprises chain.

35. A tree delimbing device, comprising:
  a. at least one horizontal delimbing blade;
  b. at least one vertical delimbing blade coupled to the horizontal delimbing blade to form a delimbing blade lattice having a plurality of apertures;
  c. a frame coupled to the delimbing blade lattice; and
  d. a "U" shaped throat formed by the frame for receiving a tree.

36. A tree delimbing device, comprising:
  a. at least one horizontal delimbing blade;
  b. at least one vertical delimbing blade coupled to the horizontal delimbing blade to form a delimbing blade lattice having a plurality of apertures;
  c. a saw box coupled to the delimbing blade lattice;
  d. a first rearward facing delimbing blade coupled to the saw box;
  e. a frame coupled to the blade lattice; and
  f. a second rearward facing delimbing blade coupled to the frame.

37. A tree delimbing device, comprising:
  a. at least one horizontal delimbing blade;
  b. at least one vertical delimbing blade coupled to the horizontal delimbing blade to form a delimbing blade lattice having a plurality of apertures;
  c. a saw box coupled to the delimbing blade lattice; and
  d. a barrier that is generally horizontally suspended in front of the delimbing blade lattice.

38. The tee delimbing device of claim 37, wherein the suspended barrier can move in the vertical direction.

39. The tree delimbing device of claim 38, wherein the suspendeds barrier comprises pipe.

40. A tree delimbing device, comprising:
  a. at least one horizontal delimbing blade;
  b. at least one vertical delimbing blade coupled to the horizontal delimbing blade to form a delimbing blade lattice having a plurality of apertures;
  c. a saw box coupled to the delimbing blade lattice; and
  d. at least one flexible divider bisecting at least one of the apertures.

41. The tree delimbing device of claim 40, wherein the flexible divider contains slack allowing it to move in the horizontal direction.

42. The tree delimbing device of claim 40, wherein the flexible divider comprises cable.

43. The tree delimbing device of claim 40, wherein the flexible divider comprises chain.

44. A tree delimbing device, comprising:
a. at least one horizontal blade;
b. at least one vertical blade coupled to the horizontal blade to form a delimbing blade lattice having a plurality of apertures;
c. a fram coupled to the delimbing blade lattice; and
d. a barrier that is generally horizontally suspended in front of the delimbing blade lattice.

45. The tree delimbing device of claim 44, wherein the frame contains a throat.

46. The tree delimbing device of claim 45, wherein the throat is located above the delimbing blade lattice.

47. The tree delimbing device of claim 46, wherein the throat is "U" shaped.

48. The tree delimbing device of claim 46, wherein a portion of the frame slopes downward toward the throat.

49. The tree delimbing device of claim 44, further comprising a saw coupled to the blade lattice.

50. The tree delimbing device of claim 49, further comprising a saw box coupled to the delimbing blade lattice for housing the saw.

51. The tree delimbing device of claim 50, further comprising a first rearward facing delimbing blade coupled to the saw box.

52. The tree delimbing device of claim 51, further comprising a second rearward facing delimbing blade coupled to the frame.

53. The tree delimbing device of claim 44, wherein the suspended barrier can move in the vertical direction.

54. The tree delimbing device of claim 44, wherein the barrier comprises pipe.

55. A tree delimbing, comprising:
a. at least one horizontal blade;
b. at least one vertical blade coupled to the horizontal blade to form a delimbing blade lattice having a plurality of apertures;
c. a frame coupled to the delimbing blade lattice; and
d. at least one flexible divider bisecting at least one of the apertures.

56. The tree delimbing device of claim 55, wherein the flexible divider contains slack allowing it to move in the horizontal direction.

57. The tree delimbing device of claim 55, wherein the flexible divider comprises cable.

58. The tree delimbing device of claim 55, wherein the flexible divider comprises chain.

59. The tree delimbing device of claim 55, wherein the frame contains a throat for delimbing trees.

60. The tree delimbing device of claim 55, further comprising a saw coupled to the frame.

61. The tree delimbing device of claim 60, further comprising a saw box for housing the saw.

62. The tree delimbing device of claim 61, further comprising a first rearward facing delimbing lade coupled to the saw box.

63. The tree delimbing device of claim 62, further comprising a second rearward facing delimbing blade coupled to the frame.

64. A method of delimbing a tree, the method comprising:
a. grasping in a bundle multiple tree trunks having butt ends and limbs on the opposite ends proximate the butt ends;
b. topping all the tree trunks with a single cut;
c. moving the bundle generally longitudinally in the direction of the butt ends so that the limbs are sheared from the trunks by at least one rear-facing blade; and
d. moving the bundle generally in the opposite direction to shear limbs from the trunks by front-facing blades.

65. The method of claim 64, wherein moving the bundle in the opposite direction to shear limbs from the trunks is carried out by pushing the bundle of trees through a delimbing blade lattice.

66. A method for delimbing a tree, the method comprising:
a. a grasping in a bundle multiple tree trunks having butt ends and limbs on the opposite ends proximate the butt ends;
b. moving the bundle generally longitudinally in the direction of the butt ends so that the limbs are sheared from the trunks by at least one rear-facing blade; and
c. moving the bundle generally in the opposite direction to shear limbs from the trunks by front-facing blades.

67. The method of claim 66, further comprising topping all the tree trunks with a single cut.

68. A method for delimbing a tree, the method comprising:
a. grasping in a bundle multiple tree trunks having butt ends and limbs on the opposite ends proximate the butt ends;
b. topping all the tree trunks with a single cut; and
c. moving the bundle generally longitudinally in the opposite direction of the butt ends to shear limbs from the trunks by front-facing blades.

69. The method of claim 68, further comprising moving the bundle generally longitudinally in the direction of the butt ends so that the limbs are sheared from the trunks by at least one rear-facing blade.

70. A tree delimbing device, comprising:
a. a frame;
b. a delimbing lattice coupled to the frame and comprising at least two shearing members for delimbing a tree; and
c. a trough coupled to the frame for directing trees into the delimbing lattice comprising a floor and at least one side positioned adjacent to the floor.

71. The tree delimbing device of claim 70, wherein at least one of the at least two shearing members comprises a blade.

72. A tree delimbing device, comprising:
a. a frame;
b. a delimbing lattice coupled to the frame and comprising at least two shearing members for delimbing a tree;
c. a trough having a floor and coupled to the frame for directing trees into the delimbing lattice; and
d. wherein at least one of the at least two shearing members comprises a flexible divider.

73. The tree delimbing device of claim 72, wherein at least one of the at least two shearing members comprises a chain.

74. The tree delimbing device of claim 72, wherein at least one of the at least two shearing members comprises a cable.

75. The tree delimbing device of claim 70, wherein at least one of the at least two shearing members comprises a rigid member.

76. The tree delimbing device of claim 70, wherein the at least two shearing members are positioned generally orthogonal relative to each other.

77. The tree delimbing device of claim 70, wherein at least one of the at least two shearing members is positioned generally orthogonal to the floor of the trough.

78. The tree delimbing device of claim 70, wherein at least one of the at least two shearing members is positioned generally parallel to the floor of the trough.

79. The tree delimbing device of claim 70, wherein the at least two shearing members are positioned at acute angles relative to each other.

80. The tree delimbing device of claim 70, wherein at least one of the at least two shearing members is positioned at an acute angle relative to the floor of the trough.

81. The tree delimbing device of claim 70, further comprising a saw coupled to the frame for cutting wood.

82. The tree delimbing device of claim 81, further comprising a saw box for protecting the saw.

83. A tree delimbing device, comprising:
 a. a frame;
 b. a delimbing lattice coupled to the frame and comprising at least two shearing members for delimbing a tree;
 c. a trough having a floor and coupled to the frame for directing trees into the delimbing lattice;
 d. a saw coupled to the frame for cutting wood;
 e. a saw box for protecting the saw; and
 f. at least one shearing member coupled to an outside surface of the saw box.

84. The tree delimbing device of claim 70, wherein the frame further comprises a throat for receiving trees.

85. The tree delimbing device of claim 84, wherein the throat further comprises at least one shearing member.

86. The tree delimbing device of claim 70, further comprising a trailer assembly coupled to the trough and comprising;
 an axel;
 a plurality of wheels coupled to the axel; and
 a hitch for trailering the tree delimbing device.

87. A tree delimbing device, comprising:
 a. a frame;
 b. a delimbing lattice coupled to the frame and comprising at least two shearing members for delimbing a tree;
 c. a trough havinga floor and coupled to the frame for directing trees into the delimbing lattice; and
 d. a barrier suspended proximate the delimbing lattice.

88. The tree delimbing device of claim 87, wherein the barrier is a pipe.

89. The tree delimbing device of claim 87, wherein the barrier is positioned generally parallel to the floor of the trough.

90. A tree delimbing device, comprising:
 a. a trough having a floor and at least one side wall;
 b. a frame having a throat and being coupled to the trough at one end;
 c. a lattice coupled to the frame and comprising:
  at least one tree shearing member positioned generally orthogonal to the floor of the trough; and
  at least one tree shearing member positioned generally parallel to the floor of the trough;
 e. a saw coupled to the frame for cutting wood;
 f. a saw box coupled to the frame for protecting the saw;
 g. at least one shearing member coupled to the throat; and
 h. a trailer assembly coupled to the trough and comprising;
  an axel;
  a plurality of wheels coupled to the axel; and
  a hitch for trailering the tree delimbing device.

91. The tree delimbing device of claim 35, further comprising a trough coupled to the frame for directing trees into the delimbing blade lattice.

92. The tree delimbing device of claim 35, further comprising a saw housed in a saw box and coupled to the frame for topping trees located in the throat.

93. The tree delimbing device of claim 92, further comprising a first rearward facing delimbing blade coupled to the saw box.

94. The tree delimbing device of claim 93, further comprising a second rearward facing delimbing blade coupled to the frame.

95. The tree delimbing device of claim 35, further comprising a barrier that is generally horizontally suspended in front of the delimbing blade lattice.

96. The tree delimbing device of claim 35, further comprising at least one flexible divider bisecting at least one of the apertures.

\* \* \* \* \*